US012749027B2

(12) United States Patent
Ben Aicha et al.

(10) Patent No.: US 12,749,027 B2
(45) Date of Patent: Sep. 29, 2026

(54) ORCHESTRATION OF BOOKING MATCHING

(71) Applicant: Amadeus S.A.S., Biot (FR)

(72) Inventors: Assma Ben Aicha, Nice (FR); Alejandro De Abajo Sanz, Majadahonda (ES); Ana Arribas, Madrid (ES); David-Olivier Saban, Cagnes-sur-mer (FR); Gabrielle Sabatier, Biot (FR)

(73) Assignee: Amadeus S.A.S., Biot (FR)

( * ) Notice: Subject to any disclaimer, the term of this patent is extended or adjusted under 35 U.S.C. 154(b) by 7 days.

(21) Appl. No.: 19/020,128

(22) Filed: Jan. 14, 2025

(65) Prior Publication Data

US 2025/0307718 A1 Oct. 2, 2025

(30) Foreign Application Priority Data

Mar. 29, 2024 (EP) .................................... 24305498

(51) Int. Cl.
*G06Q 10/02* (2012.01)

(52) U.S. Cl.
CPC .................................... *G06Q 10/02* (2013.01)

(58) Field of Classification Search
CPC ..................................................... G06Q 10/02
See application file for complete search history.

(56) References Cited

U.S. PATENT DOCUMENTS

2002/0069093 A1* 6/2002 Stanfield ................ G06Q 10/02 705/5
2011/0071865 A1* 3/2011 Leeds .................. G06Q 10/025 707/E17.014

(Continued)

FOREIGN PATENT DOCUMENTS

GB 2345775 A 7/2000

OTHER PUBLICATIONS

Stavrakis, Koutsabasis, Gavalas and Vosinakis, "TouristHub: User Experience and Interaction Design for Supporting Tourist Trip Planning," 2020 IEEE 10th International Conference on Intelligent Systems (IS), Varna, Bulgaria, 2020, pp. 370-379 (Year: 2020).*

(Continued)

*Primary Examiner* — Jeff Zimmerman
*Assistant Examiner* — Wayne S. Murray
(74) *Attorney, Agent, or Firm* — Thompson Hine LLP

(57) ABSTRACT

Methods, systems, and computer program products for determining eligible lead information for accurate matching to booking events. A matching event from a service provider associated with one or more booking events is received. A lead lookup timeframe and a booking lookup timeframe based on the matching event is determined. Booking event data that includes one or more sets of booking event attributes for the booking events is obtained based on the matching event and the booking lookup timeframe. Lead data for the plurality of booking events is obtained based on the matching event and the lead lookup timeframe. Eligible lead information for each booking event of the one or more booking events that is correlated with a corresponding lead from the lead data is determined based on a booking matching algorithm using on one or more criterion. The eligible lead information is provided to the service provider.

20 Claims, 6 Drawing Sheets

(56) References Cited

U.S. PATENT DOCUMENTS

| | | | | |
|---|---|---|---|---|
| 2011/0307392 | A1* | 12/2011 | Jenson | G06Q 30/016 705/304 |
| 2013/0311322 | A1* | 11/2013 | Potter | G06Q 30/0631 705/26.7 |
| 2013/0332255 | A1* | 12/2013 | Carlson | G06Q 30/0226 705/14.27 |
| 2022/0148025 | A1* | 5/2022 | Mimassi | G06Q 10/0283 |
| 2024/0265420 | A1* | 8/2024 | Glazier | G06Q 30/0214 |

OTHER PUBLICATIONS

European Patent Office, Extended European Search Report and Opinion issued in European Patent Application No. 24305498.8 on Sep. 17, 2024; 8 pages.

* cited by examiner

ORCHESTRATION OF BOOKING MATCHING

TECHNICAL FIELD

The present disclosure generally relates to computers and computer software, and more specifically, to methods, systems, and computer program products for determining eligible lead information for accurate matching to booking events.

BACKGROUND

More and more traveler's data are collected during the entire travel journey, from pre-booking through post-trip. Among which, the richest information that can assist travel providers to better understand travelers is behavior data, such as search history during inspiration and interactions with future bookings during post-booking and associated recommendations during a travel experience (e.g., recommendations to a guest during a hotel stay). However, the travel data normally lacks personally identifiable information (PII) (also referred to as "personal identifiable information"). For example, PII data refers to any information that, when used alone or with other relevant data, could potentially identify a specific individual. Specifically, the online travel industry data is more challenging to analyze because of extra sparseness and dispersed user histories, especially for travel providers when providing recommendations. For example, a traveler's data may be highly dispersed across the travel journey (e.g., multiple emails, accounts, user IDs, etc.). Additionally, a traveler's data may be collected and analyzed based on a travel search request and a booking.

Often, travelers book tours and activities after arrival at a destination. Because they trust hoteliers, tourism offices and destination organizations, travelers often ask staff for recommendations. Suggesting the most appropriate activities and experiences can be a challenge for traveler-facing staff who generally handle these requests by providing leaflets and maps. To address this challenge, a digital catalog of experiences may be provided that gives tools to recommend activities that are more relevant to each guest and traveler. Hotels can also use experiences to inspire their traveling customers, and trigger their next vacation bookings based on their preferences, by providing them with relevant offers pushed at the right time. Hotels could use experiences to increase customer loyalty by always providing offers that match their needs and vacation preferences.

A booking management service may aggregate experiences on an offer in a local region for tourists to book. For example, the regional experiences may include a walking tour, a local event such as a play or a movie theater, a kayak adventure, local restaurants, and the like. The hotel may act as a broker, proposing the experiences that they wish to recommend because they are close to the hotel and/or considered to have been positive experiences for previous hotel guests. Other brokers (e.g., tourist offices) may be considered but hotels are the primary broker for offering suggested experiences. For example, a hotel may propose a collection of experiences to a guest and the guest may browse the experiences within a travel platform via the hotel or other travel website, and then the guest may be taken through to a booking management service to proceed with a booking. However, multiple hotels may propose the same experiences. Thus, there is a need to identify which hotel has proposed an experience to a customer that was then followed up with a confirmed booking so that a potential commission can be paid back to the hotel from the provider of the booked experience.

Moreover, because of regulations like general data protection regulation (GDPR), there are many restrictions on using PII data, and deterministic matching, which mainly uses PII data, is not always available (e.g., privacy concerns, lack of PII data, difficulty of guaranteeing log-in account, etc.). Thus, improved methods, systems, and computer program products are needed for identifying which hotel has proposed an experience to a customer that was then followed up with a booking so that commission can then be paid back to the hotel without using PII data.

SUMMARY

In embodiments of the invention, a method for determining eligible lead information for accurate matching to booking events is provided. The method includes determining, at a data matching server, to initiate a matching event for a service provider associated with one or more booking events of a plurality of booking events. The method further includes determining a lead lookup timeframe and a booking lookup timeframe based on the matching event. The method further includes obtaining, based on the matching event and the booking lookup timeframe, booking event data for the plurality of booking events, the booking event data including one or more sets of booking event attributes for the plurality of booking events. The method further includes obtaining, based on the matching event and the lead lookup timeframe, lead data for the plurality of booking events. The method further includes determining, based on a booking matching algorithm using on one or more criterion, eligible lead information for each booking event of the one or more booking events that is correlated with a corresponding lead from the lead data. The method further includes providing the eligible lead information to the service provider.

These and other embodiments can each optionally include one or more of the following features.

In some embodiments of the invention, the one or more criterion used by the booking matching algorithm includes at least one temporal-based booking threshold. In some embodiments of the invention, the one or more criterion used by the booking matching algorithm includes a provider identification associated with each booking event, an activity identification associated with each booking event, and/or location data associated with each booking event.

In some embodiments of the invention, the eligible lead information includes a single eligible lead that includes a first booking event that is correlated with a first lead. In some embodiments of the invention, information associated with the single eligible lead is stored in an eligible lead database.

In some embodiments of the invention, the eligible lead information includes a plurality of leads, and each lead of the plurality of leads includes a corresponding booking event that is correlated with a respective corresponding lead. In some embodiments of the invention, the method further includes determining whether the plurality of leads correspond to a first referral or whether the plurality of leads correspond to a plurality of referrals. In some embodiments of the invention, in response to determining that the plurality of leads correspond to a first referral, information associated with each lead of the plurality of leads is stored in an eligible lead database.

In some embodiments of the invention, each of the one or more booking events corresponds to a respective user, and booking information corresponding with each user includes non-personal identifying information. In some embodiments of the invention, the booking information includes behavioral data associated with each respective user. In some embodiments of the invention, the behavioral data includes interactions with one or more websites associated with an event, a session duration, content displayed during an interaction with one or more websites, or a combination thereof.

In some embodiments of the invention, the one or more booking events are associated with a particular travel event, and the event search data includes travel information based on each of the plurality of travel events.

In embodiments of the invention, a system for determining eligible lead information for accurate matching to booking events is provided. The system includes one or more processors, least one memory device coupled with the one or more processors, and a data communications interface operably associated with the one or more processors, wherein the at least one memory device contains a plurality of program instructions that, when executed by the one or more processors, cause the one or more processors to perform operations. The operations may include determining, at a data matching server, to initiate a matching event for a service provider associated with one or more booking events of a plurality of booking events. The operations further include determining a lead lookup timeframe and a booking lookup timeframe based on the matching event. The operations further include obtaining, based on the matching event and the booking lookup timeframe, booking event data for the plurality of booking events, the booking event data including one or more sets of booking event attributes for the plurality of booking events. The operations further include obtaining, based on the matching event and the lead lookup timeframe, lead data for the plurality of booking events. The operations further include determining, based on a booking matching algorithm using on one or more criterion, eligible lead information for each booking event of the one or more booking events that is correlated with a corresponding lead from the lead data. The operations further include providing the eligible lead information to the service provider.

In embodiments of the invention, a computer program product for determining eligible lead information for accurate matching to booking events is provided. The computer program product includes a non-transitory computer-readable storage medium and program code stored on the non-transitory computer-readable storage medium that, when executed by one or more processors, causes the one or more processors to perform operations. The operations may include determining, at a data matching server, to initiate a matching event for a service provider associated with one or more booking events of a plurality of booking events. The operations further include determining a lead lookup timeframe and a booking lookup timeframe based on the matching event. The operations further include obtaining, based on the matching event and the booking lookup timeframe, booking event data for the plurality of booking events, the booking event data including one or more sets of booking event attributes for the plurality of booking events. The operations further include obtaining, based on the matching event and the lead lookup timeframe, lead data for the plurality of booking events. The operations further include determining, based on a booking matching algorithm using on one or more criterion, eligible lead information for each booking event of the one or more booking events that is correlated with a corresponding lead from the lead data. The operations further include providing the eligible lead information to the service provider.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
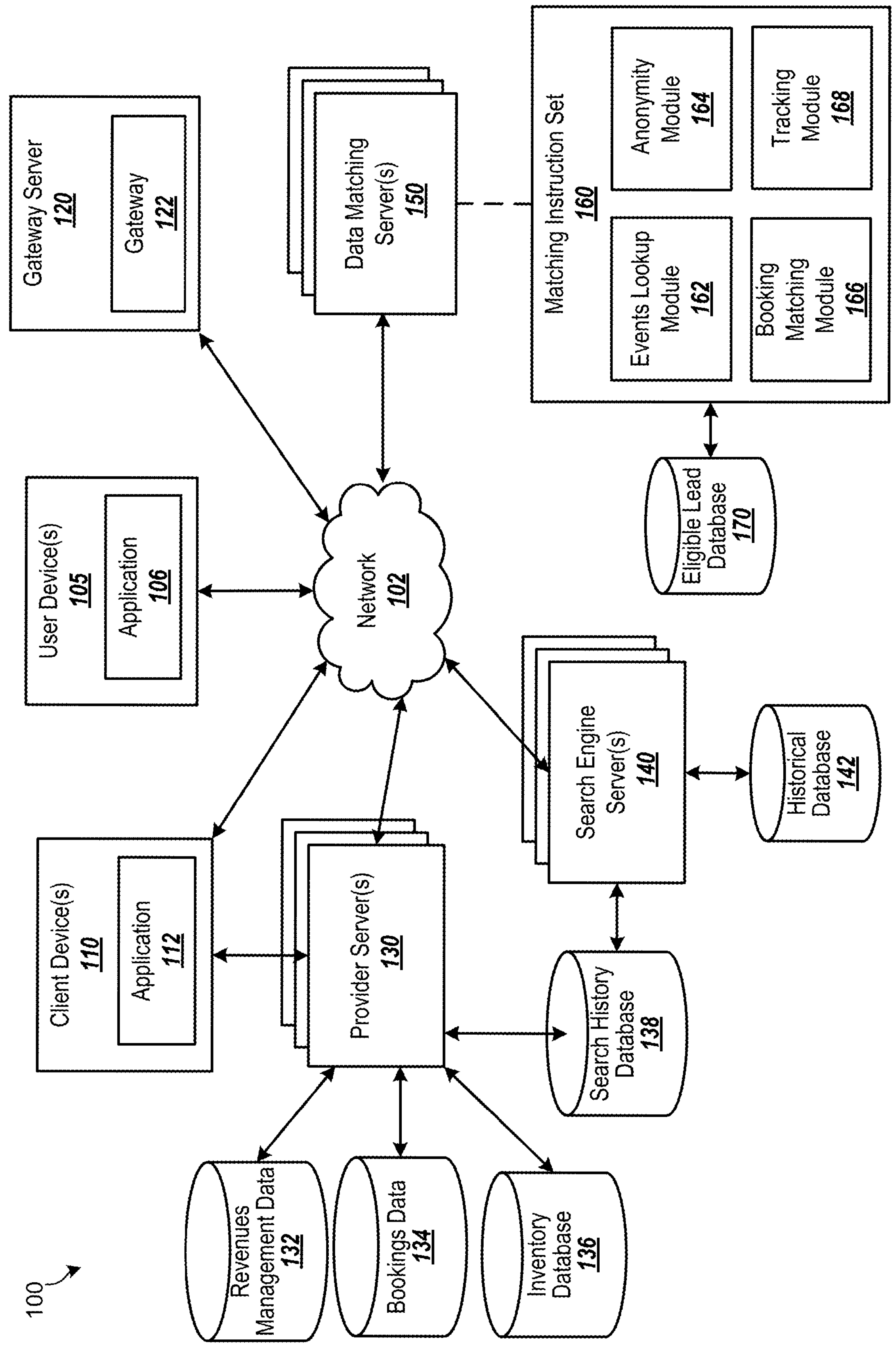
FIG. 1 illustrates an environment for determining eligible lead information for accurate matching to booking events, according to embodiments of the invention.

A booking management service may aggregate experiences on an offer in a local region for tourists to book. For example, the regional experiences may include a walking tour, a local event such as a play or a movie theater, a kayak adventure, local restaurants, and the like. The hotel may act as a broker by proposing the experiences that they wish to recommend because they are close to the hotel and/or they are considered to have been positive experiences for previous hotel guests. Other brokers (e.g., tourist offices) may be considered but hotels are the main broker for offering suggested experiences. For example, a hotel may propose a collection of experiences to a guest and the guest may browse the experiences within a travel platform via the hotel or other travel website, and then be taken through to a booking management service to proceed with a booking. However, multiple hotels may propose the same experiences. Thus, embodiments of the present invention permit identification of which hotel has proposed a particular experience to a guest that was then followed up with a confirmed booking so that a potential commission can be paid back to the hotel from the provider of the booked experience.

Moreover, because of regulations like general data protection regulation (GDPR), there are many restrictions on using PII data, and deterministic matching, which mainly uses PII data, is not always available (e.g., privacy concerns, lack of PII data, difficulty of guaranteeing log-in account, etc.). For example, hotel reservation systems may provide recommendations to travelers for booking activities (also referred to as "experiences"), but a traveler may be redirected to a booking management service (BMS) to directly book the activity. A booking management service aggregates experiences offered in a local region for tourists to book. The experiences may be walking tours, kayak hires, restaurants, and the like. A hotel may operate as a broker by proposing a collection of experiences as recommendations to a guest. The guest may browse the experiences within the hotel's platform and then be taken through to a BMS to initiate a booking. Because multiple hotels may propose the same experiences, a hotel may not know whether or not their lead for the activity resulted in a direct booking in order to request lead generation revenue from the booking. A problem solved by the embodiments of the present invention is identifying which hotel has proposed an experience to a customer that was then followed up with a booking so that commission can then be paid back to the hotel.

Improved methods, systems, and computer program products are provided for identifying which hotel has proposed an experience to a customer that was then followed up with a booking so that commission can then be paid back to the hotel without using PII data. The technology described in this patent application is related to systems and methods for implementing a user identification system without the use of PII and by using booking matching algorithms for determining eligible lead information for accurate matching to booking events (e.g., identifying whether a booked activity matches a generated lead from a particular hotel). In some implementations, the matched information may be utilized to offer a tracking solution to correlate bookings with the owner of the suggestions and/or to recover previous searches and bookings in order to propose content (recommender system). Additionally, for advertising use cases, the booking matching information can also help build improved user profiles and segmentation of travelers for the travel recommendation providers (e.g., hotels).

More specifically, the technology described in this patent application includes a method that comprises receiving, at a data matching server, a matching event (e.g., a booking match) from a service provider (e.g., a hotel) associated with one or more booking events (for a traveler) of a plurality of booking events. For example, the service provider may be an event/trip provider, hotel, airline agency, travel agency, metasearch engine, a global distribution system (GDS), or based on the location of the service provider. The method may further include determining a lead lookup timeframe and a booking lookup timeframe based on the matching event (e.g., a lead lookup timeframe of approximately one to two days and a booking lookup timeframe of approximately one to two hours). The method may further include obtaining, based on the matching event and the booking lookup timeframe, booking event data for the plurality of booking events, the booking event data including one or more sets of booking event attributes for the plurality of booking events (e.g., obtain and sort bookings by date). The method may further include obtaining, based on the matching event and lead lookup timeframe, lead data for the plurality of booking events (e.g., fetch leads from a database). The method may further include determining, based on a booking matching algorithm (e.g., match table, unmatched bookings map), eligible lead information based on one or more criterion for each booking event of the one or more booking events that is correlated/matched with a corresponding lead from the lead data. For example, the criteria may include analysis of all available leads until a configurable number of minutes before the booking, or using a provider ID, an activity ID, or any other parameter available in leads and bookings (e.g., guest information). The method may further include providing the eligible lead information to the service provider (e.g., if a single eligible lead=match; several leads=referral; several referrals then no match).

FIG. 1 is an example environment 100 for implementing a process for determining eligible lead information for accurate matching to booking events, according to embodiments of the invention. The example environment 100 includes a client device 110, a user device 105, a gateway server 120, one or more provider server(s) 130, one or more search engine server(s) 140, and one or more data matching server(s) 150, that communicate over a data communication network 102, e.g., a local area network (LAN), a wide area network (WAN), the Internet, a mobile network, or a combination thereof.

The user device 105 (e.g., an electronic device used by a user, such as a traveler booking a trip) and the client device 110 (e.g., an electronic device used by a service provider) can include a desktop, a laptop, a server, or a mobile device, such as a smartphone, tablet computer, wearable device (e.g., smartwatch), in-car computing device, and/or other types of mobile devices. The user device 105 includes applications, such as the application 106, for managing and booking a travel request with the one or more merchants associated with the one or more provider server(s) 130. The entities associated with the provider servers 130 may include travel provider entities such as airlines, hotel, rental car, etc. Additionally, entities associated with the provider servers 130 may include booking management services for an activity or experience providers such as tours, museums, diving trips, and the like. The client device 110 includes applications, such as the application 112, for managing a matching event and matching results to/from the one or more data matching server(s) 150 via the gateway server 120. The client device 110 can include other applications. The client device 110 (e.g., a travel merchant) initiates a matching event by a service provider via application 112. A matching event may include availability search queries by requesting entities (such as clients, applications, browsers installed on user terminals, etc.) during a search (e.g., airline and/or hotel booking search). Additionally, a matching event may include an in-application matching event after a travel booking has been initiated and/or completed. A service provider of a matching event with a client device 110 via an event provider server 130 may include an airline agency, travel agency, metasearch engine, or a global distribution system (GDS). For example, hotel reservation systems may provide recommendations to travelers for booking activities, but a traveler may be redirected to a BMS to directly book the activity. Thus, the hotel reservation system may not know whether or not their lead for the activity resulted in a direct booking in order to request lead generation revenue from the booking agency.

The gateway 122 of the gateway server 120 manages the location of booking requests received from an application from the one or more user devices (e.g., a traveler's device) and matching events received from application 112 from the one or more client devices 110. The management protocols of the gateway server 120 may be based on a redundant load-balancing system by managing multiple clients (e.g., client device(s) 110) so that a matching event is handled by one of the one or more data matching server(s) 150. For example, there may be multiple data matching server(s) 150 that are able to service the matching event, and the redundant load-balancing system of the gateway server 120 is responsible for ensuring that the matching event is performed by one of the capable data matching server(s) 150.

The gateway server 120 may be a front-end server for managing, collecting, processing, and communicating availability queries (e.g., matching event), resource information, revenues management data, bookings data, airlines/system configurations data, etc., that is stored in the historical database 142 from one or more search engine server(s) 140. The one or more search engine server(s) 140 may include travel agencies or similar search providers (e.g., online travel agencies, metasearches, tour operators, and the like). Further, the gateway server 120 may be front end server for managing, collecting, processing, and communicating matching results from one or more data matching server(s) 150 to the client devices 110 via application 112. In an exemplary embodiment, for an airline booking example, the gateway server 120 may be a front end server for collecting, processing, and storing travel information (e.g., flight schedules, flight information such as such as departure and destination airport, airline, departure and return dates, fares, booking classes, passenger information, and the like) from a plurality of external travel systems (e.g., airport information systems, airline information systems, third-party intermediator systems, etc.) via the one or more event provider server(s) 130, the one or more search engine server(s) 140 to access the collective historical database 142, and/or the one or more data matching server(s) 150.

The one or more event provider server(s) 130 receives and processes travel inventory data such as revenue data stored in a revenues management database 132 from one or more revenue management system(s), bookings data stored in a bookings database 134 from one or more bookings management system(s), airlines/system inventory data from an inventory database 136 from one or more airlines/system configurations management system(s), and the like as real-time market data. The one or more event provider server(s) 130 stores the travel inventory data from the multiple sources (e.g., revenues management database 132, bookings database 134, inventory database 136, etc.) in the historical database 142 for historical market data. Additionally, event logs are stored in the search history database 138 that can be accessed by an event provider server 130 and/or a search engine 140. The event logs may be collected from applications/websites that may contain rich behavioral data (e.g., data about user interaction with the applications/websites).

The one or more data matching server(s) 150 receives and processes, via the matching instruction set 160, the matching event(s) from the gateway server 120. The matching instruction set 160 includes an events lookup model 162, an anonymity model 164, a booking matching model 166, and a tracking model 168.

The matching instruction set 160 is configured to implement determining eligible lead information for accurate matching to booking events based on matching protocols as described herein. In some implementations, the matching instruction set 160 via the events lookup model 162, looks up event data and manages storage of eligible lead information via the eligible lead database 170. For example, eligible leads may be created for each potential lead as discussed herein.

In some implementations, the matching instruction set 160 via the anonymity model 164, manages nondirect PII data for potential candidates for each. For example, via the anonymity model 164, nondirect PII data may be obtained such that a user didn't accept/approve them and so the matching would be trivial. For example, location information (e.g., GPS data) of the user may be used as a parameter to identify eligible lead information. However, the traveler may not be on-site and far from the location of the activity (e.g., a booking made following a pre-trip email campaign of a travel agency or a hotel). However, in most cases, people are booking while on site (e.g., at the hotel) and so it may be likely that the booking is related to someone close than some far away from the booking location such that the chance for associating a booking to some is inverse proportional to the distance (e.g., the closest has the highest chance).

In some implementations, the matching instruction set 160 via the booking matching module 166, tracks booking features based on similarities between events within a leads lookup timeframe and a booking lookup timeframe. For example, the booking matching module 166 can correlate (e.g., match), one or more booking events to one or more lead events based on a booking matching algorithm using on one or more criterion (e.g., a match table, unmatched bookings map, etc.).

In some implementations, the matching instruction set 160 via the tracking model 168, utilizes one or more machine learning methodologies to output matching probabilities. For example, the matched information may be utilized to offer a tracking solution via the tracking model 168 to correlate bookings with the owner of the suggestions and/or to recover previous searches and bookings in order to propose content (recommender system).

Figure 2:
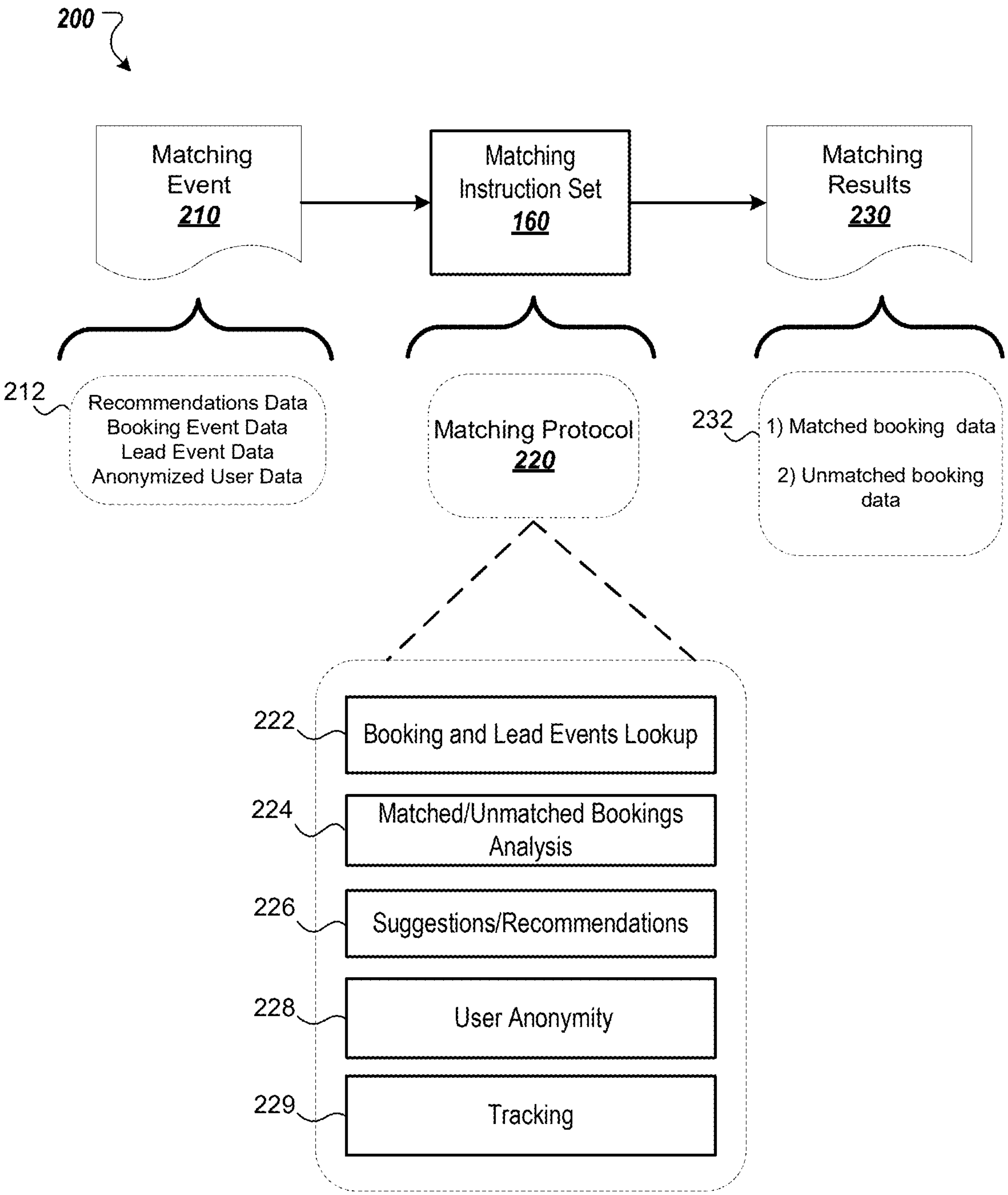
FIG. 2 illustrates an example of determining matching results based on a matching event, according to embodiments of the invention.
Figure 3:
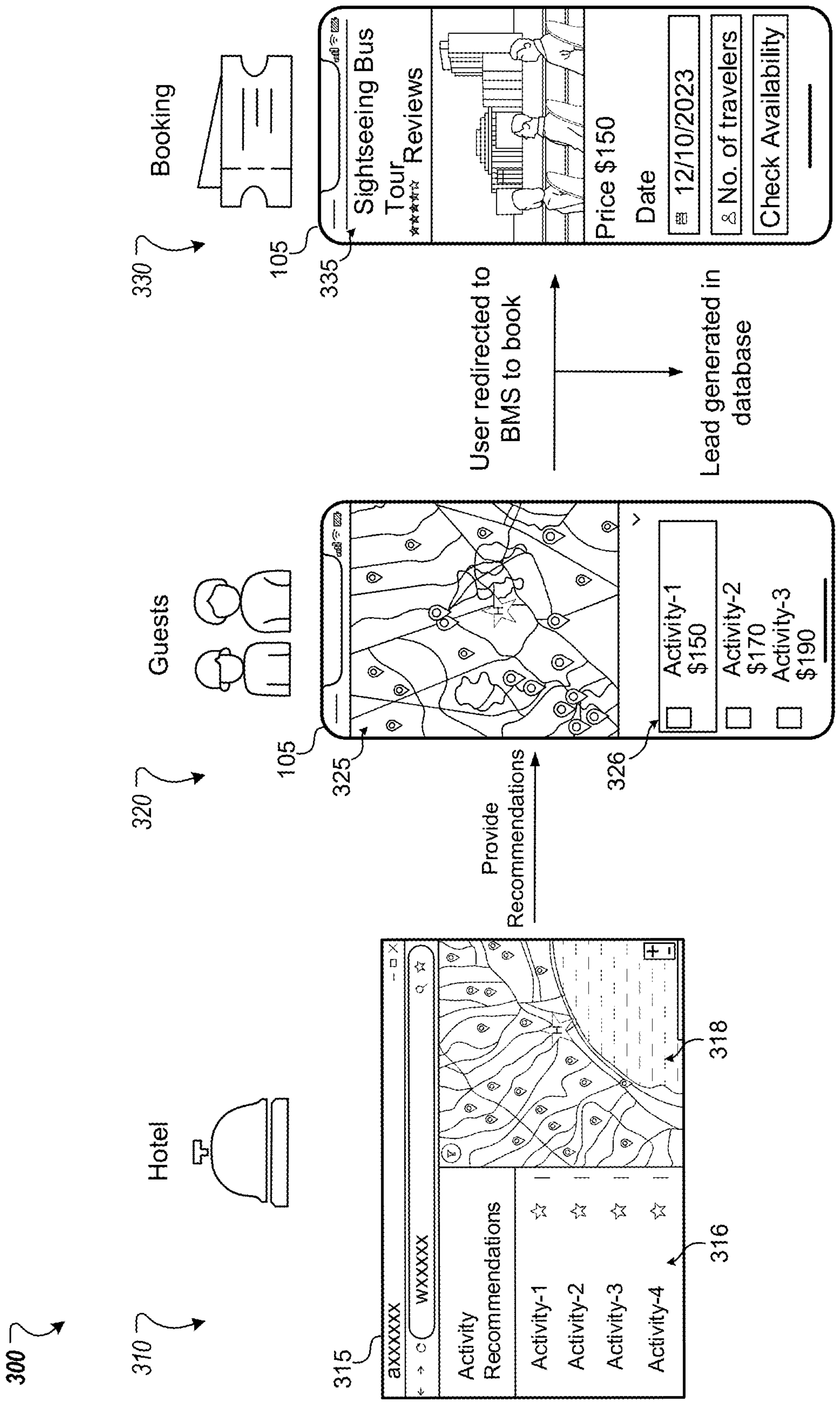
FIG. 3 illustrates an example of generating a lead based on a recommendation, according to embodiments of the invention.
Figure 4:
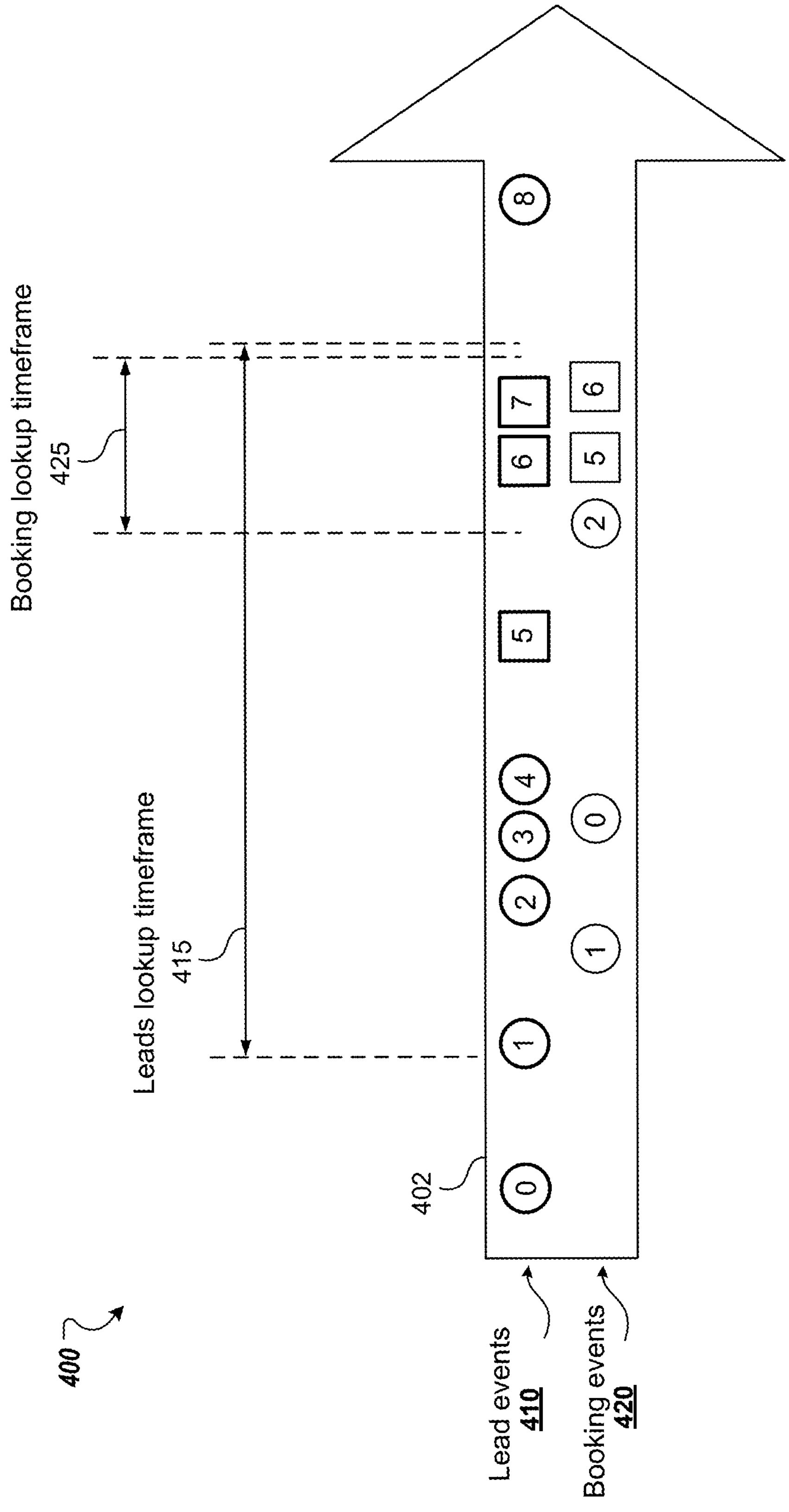
FIG. 4 illustrates an example for matching bookings over a period of time to identify eligible lead information, according to embodiments of the invention.
Figure 5:
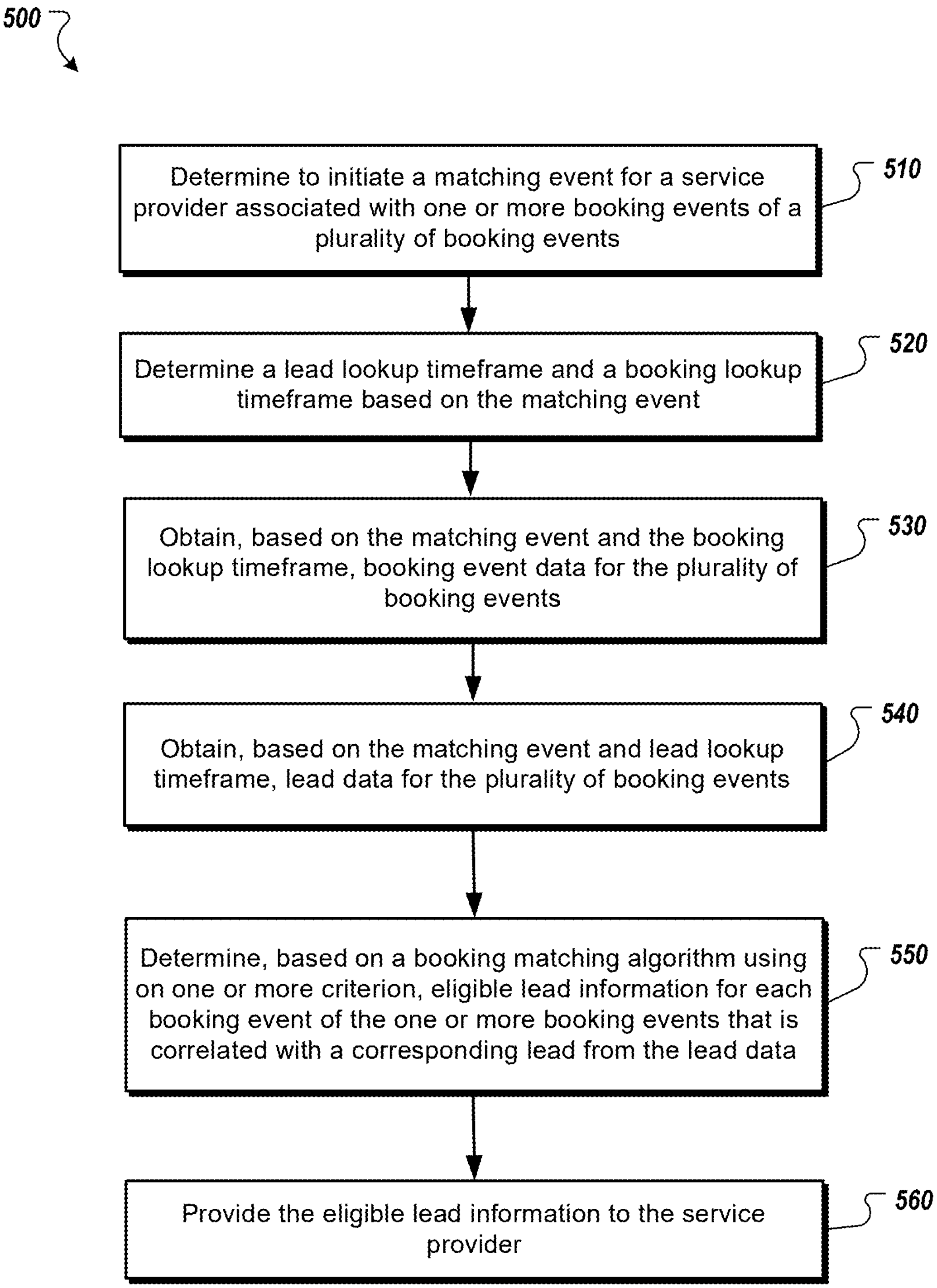
FIG. 5 is a flowchart of a method for determining eligible lead information for accurate matching to booking events, according to embodiments of the invention.

An example routine of implementing a booking matching based on a matching protocol as illustrated in the environment of FIG. 1 is further discussed herein with reference to the illustrations in FIGS. 2-4 and via the process flow diagram of FIG. 5.

FIG. 2 illustrates an example of determining matching results based on a matching event, according to embodiments of the invention. In particular, FIG. 2 illustrates an example environment 200 for implementing a leads-to-bookings matching determination process to determine matching results 230 based on receiving a matching event 210. An objective for the matching instruction set 160 is to determine eligible lead information for accurate matching to booking events, and the additional challenges of matching lead and booking data (e.g., traveler data) with the limitations of PII data (which are difficult to guarantee). For example, the matching instruction set 160, stored on a data matching server 150, receives a matching event 210 (e.g., from a client device 110). The matching event 210 may include request data 212 such as recommendations data, booking event data, lead event data, anonymized user data, and the like. For example, the matching event 210 for a particular event may include available identification data such as an activity/experience provider ID, an activity ID, and other parameters available in leads and bookings. The matching results 230 may include matching results data 232 such as matched booking data and unmatched booking data.

The matching instruction set 160 initiates implementing a leads-to-bookings matching determination process based on a matching protocol 220 to generate matching results 230. In some implementations, the matching protocol 220 may include, for example, a booking and lead events lookup module 222, a matched/unmatched booking analysis module 224, a suggestions/recommendations module 226, a user anonymity module 228, and a tracking module 229 to implement the one or more processes described herein. For example, the booking and lead events lookup module 222 may obtain eligible leads data from a travel provider via a provider server 130 (e.g., a hotel) and eligible bookings data from another travel provider via another provider server 130

(e.g., a BMS associated with an activity provider) and store the leads/bookings data in the eligible lead database 170 for analysis by matched/unmatched booking analysis module 224. The suggestions/recommendations module 226 can manage and provide the different activity/experience provider information, such as display knowledge cards associated with each activity/experience and display links to such information geographically on an interactive map. The user anonymity module 228 manages nondirect PII data for potential candidates for each. For example, via the anonymity model 164, nondirect PII data may be obtained such that a user didn't accept/approve them and so the matching would be trivial. For example, location information (e.g., GPS data) of the user may be used as a parameter to identify eligible lead information. The tracking module 229 tracks booking features based on similarities between events within a leads lookup timeframe and a booking lookup timeframe. For example, the matched/unmatched booking analysis module 224 can correlate (e.g., match), one or more booking events to one or more lead events based on a booking matching algorithm using on one or more criterion (e.g., a match table, unmatched bookings map, etc.), and the tracking module 229 may track the matched and unmatched booking data of the matching results data 232.

FIG. 3 illustrates an example environment 300 of generating a lead based on a recommendation, according to embodiments of the invention. Moreover, FIG. 3 illustrates generating a lead based on a booked activity based on a traveler being provided a list of recommendations from a hotel. In particular, block 310 provides an example of a hotel website 315 providing different suggestions or recommendations of different activities/experiences that are within a particular geographic region of the hotel (e.g., within walking distance) that a traveler has booked or is intending to book. For example, the hotel website 315 provides a listing of recommendations of activities at area 316 (e.g., a list of experiences and some information associated with each experience, such as a rating). Additionally, the hotel website 315 displays a geographical map 318 of those recommended activities so that a user (e.g., a traveler) can visualize where each activity may be located with relation to the booked hotel.

Block 320 of the example environment 300 of generating a lead based on a recommendation provides a view of user interface 325 on the client device 105. For example, the user (e.g., a traveler) is viewing an application for the hotel that provides the listed recommendations of activities from block 310. Additionally, the view of user interface 325 indicates that the user has selected Activity-1 based on the selection block 326. Based on that selection of a particular activity, the user (e.g., a traveler) is redirected to a BMD to book the selected activity at block 330 and an eligible lead is now generated. For example, the hotel application knows that they directed a user to potentially book an activity, but the hotel cannot know whether or not the user books the activity because that is handled by a BMS associated with that activity. Block 330 of the example environment 300 of generating a lead based on a recommendation provides a view of user interface 335 on the client device 105. For example, block 330 illustrates a user trying to book the activity associated with the selection of Activity-1 (e.g., a sightseeing bus tour) via an application associated with the activity (e.g., user interface 335). In some implementations of the invention, accessing the recommendations may be accomplished via an anonymous link that could be obtained via a QR Code, an email, an SMS/text message, or the like, such that the end user (e.g., guests for hotels) will be directed to the website of the recommendation (e.g., an activity booking site).

Example environment 300 regarding activity recommendations from a hotel provider provides a nonlimiting example for the matching bookings over a period of time to identify eligible lead information processes described herein. In some implementations of the invention, the matching bookings process may be utilized for other type of actors within the travel industry for providing travelers recommendations at the initial travel provider website, and the determining if there is a matching booking event for that recommendation at another entity's website using processes described herein. Additionally, in some implementations of the invention, the matching bookings process may be utilized for other type of actors outside of the travel industry for determining eligible lead information for accurate matching to booking events (e.g., when a customer books an event at a second entity based on a recommendation from a first entity, without the first entity being provided knowledge of the booked event).

FIG. 4 illustrates an example timing diagram 400 for matching bookings over a period of time to identify eligible lead information, according to embodiments of the invention. The timing diagram 400 provides an example illustration for determining eligible lead information for accurate matching to booking events that includes an example timeline 402 of data to compare obtained lead event data (e.g., lead events 410) and booking event data (e.g., booking events 420). In particular, the timeline 402 provides a visual for lead events 410 that include lead events 0-8, and booking events 420 that include booking events 0-6 for a selected period of time.

The timing diagram 400 further includes a leads lookup timeframe 415 and a booking lookup timeframe 425. In some implementations of the invention, a process for determining eligible lead information for accurate matching to booking events may include determining a lead lookup timeframe and a booking lookup timeframe based on a matching event from a travel provider (e.g., a request from a hotel to match any booking to eligible leads that may have been initiated from the hotel's website). For example, based on the service provider (e.g., travel provider), a lead lookup timeframe may be between one to two days, and a booking lookup timeframe may be between one to two hours.

For the example illustrated by timing diagram 400, lead event 1 is booked shortly after the lead was generated, lead events 0 and 2 are booked several hours after lead was generated, lead events 2,3,4 are all from the same activity and same hotel, lead event 5 is booked several hours after lead was generated, lead event 6 is booked few minutes after lead was generated, and lead events 5,6,7 are from the same activity but different hotels. The square shape for lead events 5,6,7 indicates the same known activity (e.g., a museum tour). Additionally, booking event 0, 1 come from an old event outside booking lookup timeframe, and although booking events 2,5,6 are within the booking lookup timeframe 425, lead events 2, 5 of booking event 2 and booking event 5 are older, thus a larger booking lookup timeframe 425 may be needed.

In some implementations of the invention, to properly match some of these bookings to lead events, a resolution may be based on processes for determining eligible lead information for accurate matching to booking events as described herein. For example, booking event 2 may be matched to either lead events 2, 3, and/or 4 and they are all from same referral, thus the request (e.g., hotel) may receive their commission for the booking event 2. Additionally, since booking event 6 may be matched to lead event 6 and lead event 7, then a possible decision may not be determined based on the timeframe alone, thus the system may need to request additional information if available (e.g., activity booked, activity provider reference ID, guest information, etc.). Moreover, booking event 5 may only be matched with lead event 5. If lead event 7 generates a future booking, then the system can attribute each booking to one referral.

FIG. 5 illustrates a flowchart of an example process 500 for determining eligible lead information for accurate matching to booking events, according to embodiments of the invention. Operations of the process 500 can be implemented, for example, by a system that includes one or more data processing apparatus, such as the one or more data matching server(s) 150 of FIG. 1. The process 500 can also be implemented by instructions stored on computer storage medium (e.g., matching instruction set 160), where execution of the instructions by a system that includes a data processing apparatus causes the data processing apparatus to perform the operations of the process 500.

The system determines to initiate a matching event for a service provider associated with one or more booking events of a plurality of booking events (510). In some implementations, the matching event is associated with matching a travel booking event (e.g., a merchant searching for matches to booked events outside the merchants booking system, i.e., a hotel matching a recommended activity for a traveler to a booking for a recommendation compensation). In some implementations, the service provider may be an event/trip provider, hotel, airline agency, travel agency, metasearch engine, a GDS, or based on the location of the service provider. In some implementations, the system may initiate or auto trigger a matching event based on one or more criterion (e.g., scheduled reconciliation such as daily, weekly, or monthly). Additionally, or alternatively, in some implementations of the invention, the system may initiate a matching event based on a request from the service provider (e.g., hotel), from the entity associated with the booking event (e.g., an activity provider), from the system provider, or another entity, to initiate the matching event for reconciliation of the lead information and booking information.

In some implementations of the invention, the event includes one or more segments (events belonging to the same travel event/trip) during an event time period associated with the user. For example, as illustrated in FIG. 1, a client device 110 (e.g., a travel merchant) initiates a matching event (e.g., matching event 210) as a service provider via application 112 based on an event (e.g., searching for a booking match) associated with a user (e.g., traveler) from a user device. A service provider of a matching event (e.g., matching event 210) may include an airline agency, travel agency, metasearch engine, or a global distribution systems (GDS) as an exemplary hotel reservation system that may want to identify which hotel has proposed an experience to a customer that was then followed up with a booking so that commission can then be paid back to the hotel.

In some implementations of the invention, each of the one or more booking events correspond to a respective user (e.g., a traveler), where the booking information that corresponds with each user includes non-personal identifying information. In some implementations of the invention, the booking information includes behavioral data associated with each respective user. In some implementations of the invention, the behavioral data includes interactions with one or more websites associated with an event, a session duration, content displayed during an interaction with one or more websites, or a combination thereof. In some implementations of the invention, the one or more booking events are associated with a particular travel event, and the event search data includes travel information based on each of the plurality of travel events.

The system determines a lead lookup timeframe and a booking lookup timeframe based on the matching event (520). For example, the matching instruction set 160, stored on one or more data matching server(s) 150, receives a matching event 210 (e.g., from a client device 110 via gateway 122) and determines booking and lead events (e.g., via booking and lead events lookup module 222). For example, based on the service provider (e.g., travel provider), a lead lookup timeframe may be between one to two days, and a booking lookup timeframe may be between one to two hours. For example, as illustrated in the example environment 100 of FIG. 1, a matching instruction set 160 can receive a matching event and access data from the historical database 142, or access real-time market data from the revenues management database 132, bookings database 134, and/or the inventory database 136 associated with an entity that initiated the matching event. The market data may include user specific information or information related to the service provider in order to determine a lead lookup timeframe and/or a booking lookup timeframe associated with an entity that initiated the matching event.

The system obtains, based on the matching event and the booking lookup timeframe, booking event data for the plurality of booking events (530). In some implementations, the booking event data includes one or more sets of booking event attributes for the plurality of booking events. For example, a data matching server 150 may request booking data for a particular timeframe from one or more provider servers 130 (e.g., a BMS). In some implementations, the booking event attributes associated with a user includes non-personal identifying information (e.g., PII data). Examples of personal identifying information (PII data) may include passport information, email address, a first and last name, a phone number, and the like. Thus, the booking event attributes obtained from an activity provider may not include any PII data to match to a traveler for a hotel stay where an activity recommendation may have been provided.

The system obtains, based on the matching event and lead lookup timeframe, lead data for the plurality of booking events (540). For example, the events lookup module 162 may obtain eligible lead data from a travel provider via a provider server 130 and store the lead data in the eligible lead database 170. For example, as illustrated at block 320 in FIG. 3 the lead data may include click data on recommendations on a hotel website that redirects the guest to a BMD to potentially book an activity.

The system determines, based on a booking matching algorithm using on one or more criterion, eligible lead information for each booking event of the one or more booking events that is correlated with a corresponding lead from the lead data (550). For example, at illustrated by FIG. 4, the lead events 410 are analyzed during the leads lookup timeframe 415 and compared to (matched) the booking events 420 during the booking lookup timeframe 425.

In some implementations of the invention, the one or more criterion used by the booking matching algorithm includes at least one of a temporal-based booking threshold. For example, all available leads are analyzed until a configurable number of minutes before the booking.

In some implementations of the invention, the one or more criterion used by the booking matching algorithm includes at least one of a provider identification associated with each booking event, an activity identification associated with each booking event, and location data associated with each booking event. For example, nondirect PII data may be obtained such that a user didn't accept/approve them and so the matching would be trivial. For example, location information (e.g., GPS data) of the user may be used as a parameter to identify eligible lead information. However, the traveler may not be on-site and far from the location of the activity (e.g., booking made following a pre-trip email campaign of a travel agency or a hotel). However, in most cases, people are booking while on site (e.g., at the hotel) and so it may be likely that the booking is related to someone close than some far away from the booking location such that the chance for associating a booking to some is inverse proportional to the distance (e.g., the closest has the highest chance).

In some implementations of the invention, the eligible lead information includes a single eligible lead that includes a first booking event that is correlated with a first lead. For example, as illustrated in FIG. 4, lead event 6 is booked a few minutes after lead event 6 was generated, thus the system can determine there is a match between the lead event 6 and the booking event 6. In some implementations of the invention, information associated with the single eligible lead is stored in an eligible lead database. For example, the booking is saved in a database with extended information from the lead (e.g., eligible lead database 170).

In some implementations of the invention, the eligible lead information includes a plurality of leads, wherein each lead of the plurality of leads includes a corresponding booking event that is correlated with a respective corresponding lead. In some implementations of the invention, the process 500 further includes determining whether the plurality of leads correspond to a first referral or whether the plurality of leads correspond to a plurality of referrals. For example, if there are several leads, the system may group the leads by a referral. Additionally, if there is just one referral, the system may correlate (e.g., match) the referral with the group and select a lead closer to the booking. However, if there are several referrals, the system may not be able to accurately match the lead event and the booking event. In some implementations of the invention, in response to determining that the plurality of leads correspond to a first referral, information associated with each lead of the plurality of leads is stored in an eligible lead database. For example, the booking information from the group of leads is saved in a database with extended information from the lead (e.g., eligible lead database 170).

The system provides the eligible lead information to the service provider (560). For example, after the matching results 230 are compiled at the matching instruction set 160 at the one or more data matching server(s) 150, the booking matched data may be generated and/or updated, and provided to the requesting entity (e.g., a hotel provider or hotel reservation system) to provide to an end user (e.g., a hotel provider) at a user device via an API (e.g., application 112 at client device 110).

Figure 6:
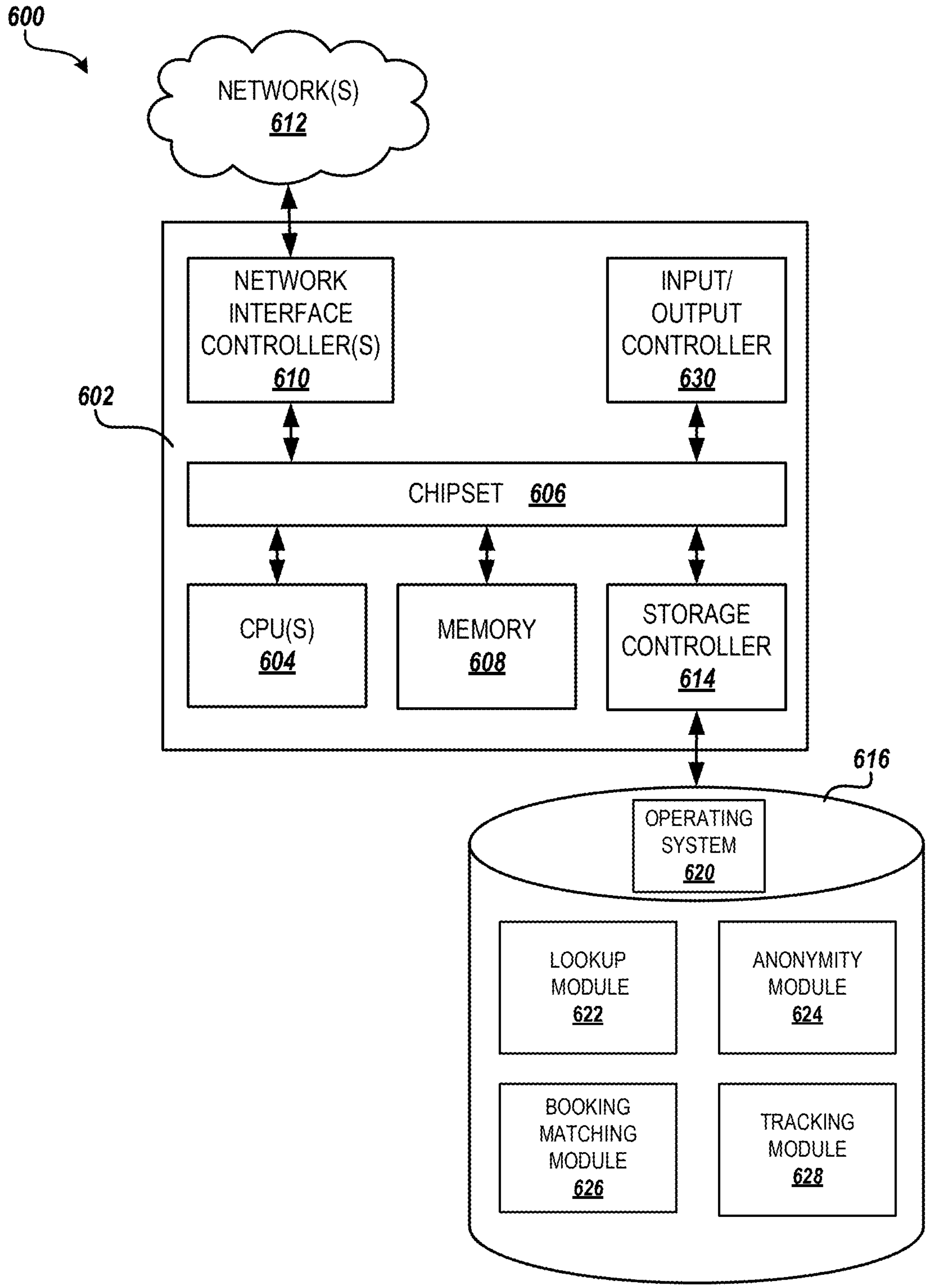
FIG. 6 is a block diagram showing an example computer architecture for a computer capable of executing the software components described herein, according to embodiments described herein.

FIG. 6 illustrates an example computer architecture 600 for a computer 602 capable of executing the software components described herein for the sending/receiving and processing of tasks. The computer architecture 600 (also referred to herein as a "server") shown in FIG. 6 illustrates a server computer, workstation, desktop computer, laptop, or other computing device, and was utilized to execute any aspects of the software components presented herein described as executing on a host server, or other computing platform. The computer 602 preferably includes a baseboard, or "motherboard," which is a printed circuit board to which a multitude of components or devices was connected by way of a communication bus or other electrical communication paths. In one illustrative embodiment, one or more central processing units (CPUs) 604 operate in conjunction with a chipset 606. The CPUs 604 can be programmable processors that perform arithmetic and logical operations necessary for the operation of the computer 602.

The CPUs 604 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements was combined to create more complex logic circuits, including registers, adders-subtractors, arithmetic logic units, floating-point units, or the like.

The chipset 606 provides an interface between the CPUs 604 and the remainder of the components and devices on the baseboard. The chipset 606 may provide an interface to a memory 608. The memory 608 may include a random-access memory (RAM) used as the main memory in the computer 602. The memory 608 may further include a computer-readable storage medium such as a read-only memory (ROM) or non-volatile RAM (NVRAM) for storing basic routines that that help to startup the computer 602 and to transfer information between the various components and devices. The ROM or NVRAM may also store other software components necessary for the operation of the computer 602 in accordance with the embodiments described herein.

According to various embodiments, the computer 602 may operate in a networked environment using logical connections to remote computing devices through one or more networks 612, a local-area network (LAN), a wide-area network (WAN), the Internet, or any other networking topology known in the art that connects the computer 602 to the devices and other remote computers. The chipset 606 includes functionality for providing network connectivity through one or more network interface controllers (NICs) 610, such as a gigabit Ethernet adapter. For example, the NIC 610 may be capable of connecting the computer 602 to other computer devices in the utility provider's systems. It should be appreciated that any number of NICs 610 may be present in the computer 602, connecting the computer to other types of networks and remote computer systems beyond those described herein.

The computer 602 may be connected to at least one mass storage device 616 that provides non-volatile storage for the computer 602. The mass storage device 616 may store system programs, application programs, other program modules, and data, which are described in greater detail herein. The mass storage device 616 may be connected to the computer 602 through a storage controller 614 connected to the chipset 606. The mass storage device 616 may consist of one or more physical storage units. The storage controller 614 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 602 may store data on the mass storage device 616 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 616 is characterized as primary or secondary storage, or the like. For example, the computer 602 may store information to the mass storage device 616 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 may further read information from the mass storage device 616 by detecting the physical states or characteristics of one or more particular locations within the physical storage units.

The mass storage device 616 may store an operating system 620 utilized to control the operation of the computer 602. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 616 may store other system or application programs and data utilized by the computer 602, such as a lookup module 622 (e.g., events lookup model 162), an anonymity module 624 (e.g., anonymity model 164), a booking matching module 626 (e.g., booking matching model 166), and a tracking module 628 (e.g., tracking model 168), according to embodiments described herein.

In some embodiments, the mass storage device 616 may be encoded with computer-executable instructions that, when loaded into the computer 602, transforms the computer 602 from being a general-purpose computing system into a special-purpose computer capable of implementing the embodiments described herein. These computer-executable instructions transform the computer 602 by specifying how the CPUs 604 transition between states, as described above. According to some embodiments, from the data matching server(s) 150 perspective, the mass storage device 616 stores computer-executable instructions that, when executed by the computer 602, perform portions of the process 500, for implementing a user identification process using booking matching algorithms without PII being readily available, as described herein. In further embodiments, the computer 602 may have access to other computer-readable storage medium in addition to or as an alternative to the mass storage device 616.

The computer 602 may also include an input/output controller 630 for receiving and processing input from a number of input devices, such as a keyboard, a mouse, a touchpad, a touch screen, an electronic stylus, or other type of input device. Similarly, the input/output controller 630 may provide output to a display device, such as a computer monitor, a flat-panel display, a digital projector, a printer, a plotter, or other type of output device. It will be appreciated that the computer 602 may not include all of the components shown in FIG. 6, may include other components that are not explicitly shown in FIG. 6, or may utilize an architecture completely different than that shown in FIG. 6.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer-implemented method comprising:

receiving, at a gateway server from a client device associated with a service provider, a matching event for the service provider, wherein the matching event is for reconciliation of booking events of a plurality of booking events with lead events of a plurality of lead events;

managing, by the gateway server, the matching event using a redundant load-balancing system such that the matching event is handled by one data matching server of a plurality of data matching servers capable of servicing the matching event;

receiving, at the one data matching server via the gateway server, the matching event;

determining, at the one data matching server executing a matching instruction set comprising an events lookup module, an anonymity module, a booking matching module, and a tracking module, to initiate a matching event for a service provider associated with one or more booking events of a plurality of booking events;

determining, at the one data matching server, a lead lookup timeframe and a booking lookup timeframe based on the matching event;

obtaining, at the one data matching server via the events lookup module of the matching instruction set and based on the matching event and the booking lookup timeframe, booking event data for the plurality of booking events from a provider server associated with a first travel provider, wherein the booking event data comprises booking information and one or more sets of booking event attributes for the plurality of booking events, wherein the booking information corresponds to a user and comprises non-personal identifying information and behavioral data associated with each user, the behavioral data comprising interactions with one or more websites associated with an event, a session duration, content displayed during an interaction with one or more websites, or a combination thereof;

obtaining, at the one data matching server via the events lookup module and based on the matching event and the lead lookup timeframe, lead data for one or more lead events of the plurality of lead events from a provider server associated with a second travel provider;

determining, at the one data matching server via the booking matching module and based on a booking matching algorithm using on one or more criterion, eligible lead information for each booking event of the one or more booking events that is correlated with a corresponding lead from the lead data, wherein the booking matching algorithm determines eligible lead information based on at least: a provider identification associated with each booking event, an activity identification associated with each booking event, and a temporal-based booking threshold applied within a lead lookup timeframe and a booking lookup timeframe, and wherein determining eligible lead information for each booking event comprises grouping eligible leads by referral;

in response to determining that a first subset of the plurality of eligible leads for the booking correspond to a single referral, selecting the eligible lead closest in time to the booking;

in response to determining that a second subset of the plurality of eligible leads for the booking correspond to different referrals, generating no match indication for each of the second subset of the plurality of eligible leads;

storing information associated with matched eligible leads in an eligible lead database; and providing, from the one data matching server via the gateway server to the client device associated with the service provider, the eligible lead information to the service provider.

2. The computer-implemented method of claim 1, wherein the one or more criterion used by the booking matching algorithm comprises at least one temporal-based booking threshold.

3. The computer-implemented method of claim 1, wherein the one or more criterion used by the booking matching algorithm comprises a provider identification associated with each booking event, an activity identification associated with each booking event, location data associated with each booking event, or a combination thereof.

4. The computer-implemented method of claim 1, wherein the eligible lead information comprises a single eligible lead, and the single eligible lead comprises a first booking event that is correlated with a first lead.

5. The computer-implemented method of claim 4, wherein information associated with the single eligible lead is stored in an eligible lead database.

6. The computer-implemented method of claim 1, wherein the eligible lead information comprises a plurality of leads, and each lead of the plurality of leads comprises a corresponding booking event that is correlated with a respective corresponding lead.

7. The computer-implemented method of claim 6, further comprising:

determining whether the plurality of leads correspond to a first referral or whether the plurality of leads correspond to a plurality of referrals.

8. The computer-implemented method of claim 7, wherein, in response to determining that the plurality of leads correspond to a first referral, information associated with each lead of the plurality of leads is stored in an eligible lead database.

9. The computer-implemented method of claim 1, wherein each of the one or more booking events corresponds to a respective user, wherein booking information corresponding with each user comprises non-personal identifying information.

10. The computer-implemented method of claim 9, wherein the booking information comprises behavioral data associated with each respective user.

11. The computer-implemented method of claim 10, wherein the behavioral data comprises interactions with one or more websites associated with an event, a session duration, content displayed during an interaction with one or more websites, or a combination thereof.

12. The computer-implemented method of claim 1, wherein the one or more booking events are associated with a particular travel event, and the booking event data comprises travel information based on each of the plurality of booking events.

13. A system comprising:

one or more processors;

a data communications interface operably associated with the one or more processors; and at least one memory device coupled to the one or more processors, wherein the at least one memory device contains a plurality of program instructions that, when executed by the one or more processors, cause the one or more processors to perform operations comprising:

receiving, at a gateway server from a client device associated with a service provider, a matching event for the service provider, wherein the matching event is for reconciliation of booking events of a plurality of booking events with lead events of a plurality of lead events;

managing, by the gateway server, the matching event using a redundant load-balancing system such that the matching event is handled by one data matching server of a plurality of data matching servers capable of servicing the matching event;

receiving, at the one data matching server via the gateway server, the matching event;

determining, at the one data matching server executing a matching instruction set comprising an events lookup module, an anonymity module, a booking matching module, and a tracking module, to initiate a matching event for a service provider associated with one or more booking events of a plurality of booking events;

determining, at the one data matching server, a lead lookup timeframe and a booking lookup timeframe based on the matching event;

obtaining, at the one data matching server via the events lookup module of the matching instruction set and based on the matching event and the booking lookup timeframe, booking event data for the plurality of booking events from a provider server associated with a first travel provider, wherein the booking event data comprises booking information and one or more sets of booking event attributes for the plurality of booking events, wherein the booking information corresponds to a user and comprises non-personal identifying information and behavioral data associated with each user, the behavioral data comprising interactions with one or more websites associated with an event, a session duration, content displayed during an interaction with one or more websites, or a combination thereof;

obtaining, at the one data matching server via the events lookup module and based on the matching event and the lead lookup timeframe, lead data for one or more lead events of the plurality of lead events from a provider server associated with a second travel provider;

determining, at the one data matching server via the booking matching module and based on a booking matching algorithm using on one or more criterion, eligible lead information for each booking event of the one or more booking events that is correlated with a corresponding lead from the lead data, wherein the booking matching algorithm determines eligible lead information based on at least: a provider identification associated with each booking event, an activity identification associated with each booking event, and a temporal-based booking threshold applied within a lead lookup timeframe and a booking lookup timeframe, and wherein determining eligible lead information for each booking event comprises grouping eligible leads by referral;

in response to determining that a first subset of the plurality of eligible leads for the booking correspond to a single referral, selecting the eligible lead closest in time to the booking;

in response to determining that a second subset of the plurality of eligible leads for the booking correspond to different referrals, generating no match indication for each of the second subset of the plurality of eligible leads;

storing information associated with matched eligible leads in an eligible lead database; and providing, from the one data matching server via the gateway server to the client device associated with the service provider, the eligible lead information to the service provider.

14. The system of claim 13, wherein the one or more criterion used by the booking matching algorithm comprises at least one temporal-based booking threshold.

15. The system of claim 13, wherein the one or more criterion used by the booking matching algorithm comprises a provider identification associated with each booking event, an activity identification associated with each booking event, location data associated with each booking event, or a combination thereof.

16. The system of claim 13, wherein the eligible lead information comprises a single eligible lead, and the single eligible lead comprises a first booking event that is correlated with a first lead.

17. The system of claim 16, wherein information associated with the single eligible lead is stored in an eligible lead database.

18. The system of claim 13, wherein the eligible lead information comprises a plurality of leads, and each lead of the plurality of leads comprises a corresponding booking event that is correlated with a respective corresponding lead.

19. The system of claim 18, further comprising:

determining whether the plurality of leads correspond to a first referral or whether the plurality of leads correspond to a plurality of referrals; and in response to determining that the plurality of leads correspond to a first referral, information associated with each lead of the plurality of leads is stored in an eligible lead database.

20. A computer program product comprising:

a non-transitory computer-readable storage medium; and program code stored on the non-transitory computer-readable storage medium that, when executed by one or more processors, causes the one or more processors to perform operations comprising:

receiving, at a gateway server from a client device associated with a service provider, a matching event for the service provider, wherein the matching event is for reconciliation of booking events of a plurality of booking events with lead events of a plurality of lead events;

managing, by the gateway server, the matching event using a redundant load-balancing system such that the matching event is handled by one data matching server of a plurality of data matching servers capable of servicing the matching event;

receiving, at the one data matching server via the gateway server, the matching event;

determining, at the one data matching server executing a matching instruction set comprising an events lookup module, an anonymity module, a booking matching module, and a tracking module, to initiate a matching event for a service provider associated with one or more booking events of a plurality of booking events;

determining, at the one data matching server, a lead lookup timeframe and a booking lookup timeframe based on the matching event;

obtaining, at the one data matching server via the events lookup module of the matching instruction set and based on the matching event and the booking lookup timeframe, booking event data for the plurality of booking events from a provider server associated with a first travel provider, wherein the booking event data comprises booking information and one or more sets of booking event attributes for the plurality of booking events, wherein the booking information corresponds to a user and comprises non-personal identifying information and behavioral data associated with each user, the behavioral data comprising interactions with one or more websites associated with an event, a session duration, content displayed during an interaction with one or more websites, or a combination thereof;

obtaining, at the one data matching server via the events lookup module and based on the matching event and the lead lookup timeframe, lead data for one or more lead events of the plurality of lead events from a provider server associated with a second travel provider;

determining, at the one data matching server via the booking matching module and based on a booking matching algorithm using on one or more criterion, eligible lead information for each booking event of the one or more booking events that is correlated with a corresponding lead from the lead data, wherein the booking matching algorithm determines eligible lead information based on at least: a provider identification associated with each booking event, an activity identification associated with each booking event, and a temporal-based booking threshold applied within a lead lookup timeframe and a booking lookup timeframe, and wherein determining eligible lead information for each booking event comprises grouping eligible leads by referral;

in response to determining that a first subset of the plurality of eligible leads for the booking correspond to a single referral, selecting the eligible lead closest in time to the booking;

in response to determining that a second subset of the plurality of eligible leads for the booking correspond to different referrals, generating no match indication for each of the second subset of the plurality of eligible leads;

storing information associated with matched eligible leads in an eligible lead database; and providing, from the one data matching server via the gateway server to the client device associated with the service provider, the eligible lead information to the service provider.

* * * * *